United States Patent [19]

Goldstein

[11] Patent Number: 5,159,656
[45] Date of Patent: Oct. 27, 1992

[54] OPTICAL FIBER SCANNING/IMAGING/PRINTING SYSTEM

[75] Inventor: Amnon Goldstein, Pelham, N.Y.

[73] Assignee: Advanced Technology Consortium, Inc., Wheatley Heights, N.Y.

[21] Appl. No.: 692,631

[22] Filed: Apr. 29, 1991

[51] Int. Cl.⁵ .......................... G02B 6/06; G03B 27/00
[52] U.S. Cl. .................................... 385/116; 385/115; 385/119; 355/1; 355/20; 355/45
[58] Field of Search ............... 350/96.15, 96.24, 96.25, 350/96.26, 96.27, 96.28; 355/1, 45, 20; 250/227.11; 385/115, 116, 117, 119, 88, 89

[56] References Cited

U.S. PATENT DOCUMENTS

| | | | |
|---|---|---|---|
| 4,287,414 | 9/1981 | Soo et al. | 350/96.10 |
| 4,570,063 | 2/1986 | De Bie et al. | 350/96.25 X |
| 4,748,680 | 5/1988 | Margolin | 350/96.24 |
| 4,760,421 | 7/1988 | Margolin | 355/1 |
| 4,762,391 | 8/1988 | Margolin | 350/96.24 |
| 4,918,304 | 4/1990 | Gordon | 250/227.26 |
| 4,975,728 | 12/1990 | Gordon | 355/1 |
| 4,975,729 | 12/1990 | Gordon | 355/1 |
| 4,991,930 | 2/1991 | Baek et al. | 385/116 |
| 5,011,261 | 4/1991 | Gordon | 385/116 |
| 5,061,035 | 10/1991 | Rogers, Jr. | 385/115 |
| 5,061,036 | 10/1991 | Gordon | 385/116 |
| 5,077,821 | 12/1991 | Makel et al. | 385/116 |

*Primary Examiner*—Brian Healy
*Attorney, Agent, or Firm*—Darby & Darby

[57] ABSTRACT

A cathode ray tube provides a two-dimensional sequential scan pattern on which dots for scanning or printing are presented as spots of light provided in sequence. A single multi-scan linear raster sweep of the cathode ray tube electron beam produces a single line of dots on the scanned image or photosensitive medium. A fiber optics array with one end facing the cathode ray tube, is configured two-dimensionally in a pattern that corresponds to the sequential sweep pattern of the cathode ray tube. The trace of dots on the cathode ray tube has sufficient length to accommodate the number of dots required for the width of the finished product or scanned image. A lens positioned between the cathode ray tube and optical fiber array, focuses the cathode ray tube image onto the fiber ends with a reduction in size. At the other end of the fiber optics array, the fibers are abutted together linearly to form the desired final output line width with coherence of the fibers from input to output. The output line width can be any desired length by abutting more optical fibers and increasing the length of the cathode ray tube sweep. Individual "fibers" may be a sub-bundle including a cluster of small diameter fibers. The speed of the cathode ray tube sweep determines the speed of the printer or scanner.

33 Claims, 4 Drawing Sheets

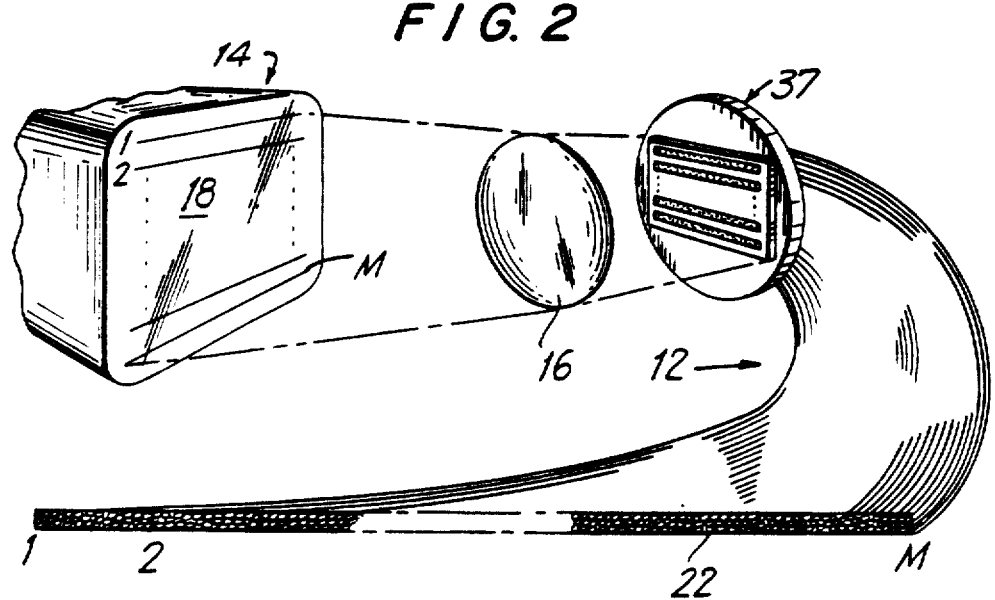
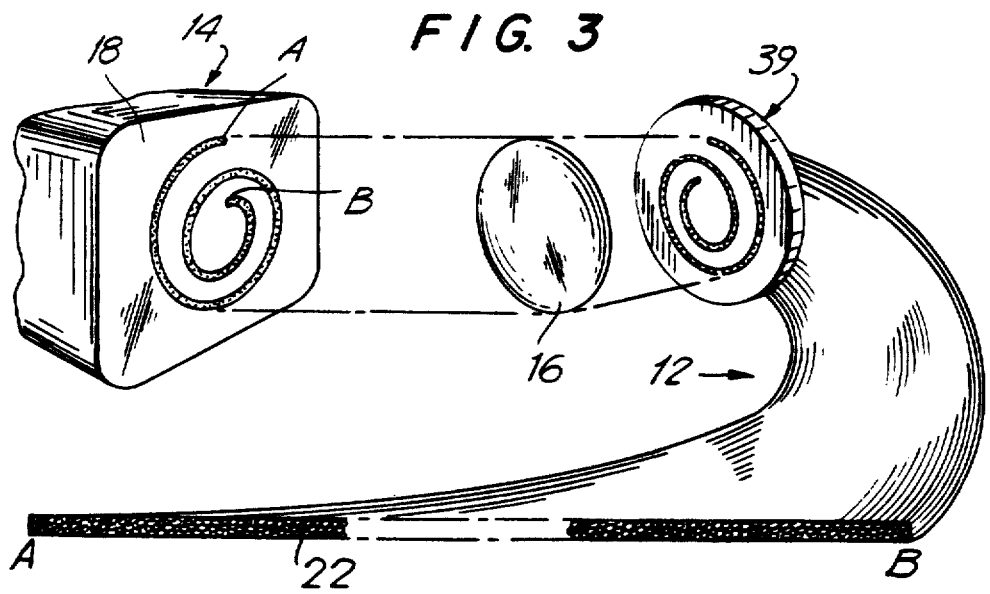

OPTICAL FIBER SCANNING/IMAGING/PRINTING SYSTEM

FIELD OF THE INVENTION

This invention relates generally to printers wherein information is applied to a photosensitive record carrier by transmitting light from an information source through optical fibers, and more particularly, to an optical printer wherein information from a two-dimensional light source is converted to a linear format for line by line application to the photosensitive record carrier.

BACKGROUND OF THE INVENTION

Computer controlled printer techniques are widespread in business and industrial applications. Laser type printers are rapidly replacing impact-type printers of the wire-dot and daisy wheel type, as well as ink jet and thermal printers. Additionally, many processes that were entirely manual are being replaced by computers and computer displays. For example, during the past decade, computer aided design (CAD) and computer aided engineering (CAE) markets have demonstrated remarkable growth. Ultimately, the work product that is initially presented on a visual display, such as a cathode ray tube or a liquid crystal screen, must be reduced to a hard copy, that is, a paper or film copy.

In all such scanning and electronic and printing applications, image reproduction quality is extremely important, but especially so with CAD/CAE, where extremely wide outputs, as much as 36 inches wide, are required for paper and photographic copies.

To use current technology to provide wider outputs, unit pricing becomes very high and restricts usage of wide output devices to larger users. Also, wider format devices operate at limited production speeds, thus reducing productivity for the user. For these reasons, wide format output devices are typically not used for proofing applications in printing and publishing, where the need or such wide formats is growing.

With regard to CAD/CAE, pen plotters and electrostatic printers have until recently filled the need for hard copies. Such printers/plotters are generally low cost and very reliable. However, they have a slow operating speed and fairly high maintenance requirements to keep the pen and ink elements from clogging or being contaminated by paper fibers.

Wide format thermal plotters are available, but are limited to a maximum resolution of 400 dots per inch (dpi) due to the difficulty of laying down uniform controllable heating elements of such small dimension. Further, thermal devices require the use of specially coated imaging materials at a considerable ongoing expense to users of these devices.

Laser systems have become the technology of choice over previously discussed technologies. Generally, mechanical means are required to transmit information coded laser light in a linear format to a photosensitive record carrier. Such mechanical devices frequently include a rotating mirror system and optical elements. As wider printing formats are required, the optical and mechanical complexities increase, reliability decreases, and wider format laser printers become very costly and, therefore, less desirable.

Cathode ray tubes (CRT) have also been used as a source of optically presented data that is transmitted to the photosensitive device by way of optical elements. For transmitting this data to the photosensitive medium, systems have been developed using coherent fiber arrays, as well as arrays of fibers that are linear at one end and random at the other end. U.S. Pat. No. 4,674,834 indicates how the face of a cathode ray tube is used as a light input to a randomly arranged array of optical fibers. The other ends of the fiber array are arranged linearly opposing a printing drum so the light is received on a line-by-line basis. Synchronized computer circuitry is required to linearize (electronically) the randomly arrayed optical signals based on stored information as to which fibers at the random end correspond to the successive linear fibers at the other end. Thus, there is a two-step process requiring calibration and data storage to deliver light signals in proper sequence to the printing mechanism.

High resolution imaging with fiber arrays has not been practical due to the difficulty in handling small diameter optical fibers, and matching them to the cathode ray tube. Any fiber defect can cause a streak in the image, and thus, make the array unusable. The image spot on the cathode ray tube face has been limited by the size and shape of the individual fibers and the cathode ray tube spot size must be smaller than the individual fiber to ensure proper imaging and minimize the effects of drift on the cathode ray tube screen.

What are needed are optical scanners and printers capable of scanning and printing, respectively, large widths for photographic and plain paper applications with high resolution, reliability, a minimal number of moving parts in the optical system, and low cost. This invention addresses solutions to all of the above requirements.

SUMMARY OF THE INVENTION

It is an object of the invention to provide improved optical printers and scanners having a construction economically adaptable for use in large width scanning and printing.

It is a further object of the invention to provide an improved optical scanner or printer that includes no moving mechanical parts in its optical system.

Another object of the invention is to provide an improved optical scanner or printer that economically provides very high resolution imaging and high speed operation.

Yet another object of the invention is to provide an improved optical scanner or printer that uses the same optical elements to produce a range of devices that have different scanning and imaging widths.

In accordance with a preferred embodiment of the invention, a two-dimensioned light source (such as a LED, LCD, light valve array or cathode ray tube) provides a conventional, two-dimensional sequential scan pattern on which dots for scanning or printing are presented as spots of light provided in sequence. In a preferred embodiment, using a CRT, this scan pattern is accomplished on the face of the tube as the electron beam is swept in a predetermined pattern. A multi-scan linear raster sweep of the cathode ray tube electron beam produces a line of dots on the scanned image or photosensitive medium. As a result, extremely wide scanning or recording lines can be generated.

The end of the fiber optic bundle that faces the cathode ray tube is configured two-dimensionally to present the fiber ends in a pattern that corresponds to the sequential sweep pattern or trace of the cathode ray tube.

The trace of data on the cathode ray tube may take any convenient shape, such that the trace has sufficient length to accommodate the number of dots required for the width of the finished product. To improve the resolution of each individual dot, a lens positioned between the face of the cathode ray tube and the two-dimensional face of the optical fiber bundle, focuses the cathode ray tube image onto the fiber ends with a reduction in size of the focused image.

At the other end of the fiber optics bundle, all of the fibers are abutted together linearly to form the desired final output line width. There is coherence of the fibers from input to output. The output line width can thus be made any desired length by simply abutting more optical fibers and increasing the length of the cathode ray tube trace or sweep.

Any cathode ray tube sweep that closes on itself reduces or eliminates retrace time of the electron beam and is desirable within the aforesaid constraints, i.e., that the sweep length correspond to the printed width of the output product. Thus, spiral sweeps, circular sweeps and any closed end sweeps, all of which are adaptable to the subject invention, are preferable as speed enhancers.

Because the fibers are small in diameter, and substantial quantities of data can be displayed on the cathode ray tube in a single sweep by controlling the sweep path, very small and relatively inexpensive cathode ray tubes are readily adapted to the subject invention. The linearized array at the output end of the fiber optics transmission array faces the photosensitive receptor medium directly or through an intermediate lens system that reduces light scattering and transmits light from the fibers.

The individual "fibers" described above as composing the fiber optics array, may be a sub-bundle including a cluster of small diameter fibers. Thus, at the input end of the optics array, each spot on the cathode ray tube is focused onto the clustered ends of a sub-bundle or light channel of fibers. As a result, requirements for precision location of the spot on the cathode ray tube are reduced without loss of resolution, and the data is not lost if individual fibers within the sub-bundles are defective, as the focused spot is sized to simultaneously cover a plurality of fibers in the channel. Instead of a single fiber dedicated to a single dot as in much of the prior art, a channel, including a plurality of fibers is dedicated to the spot/dot in the subject invention.

The speed of the cathode ray tube sweep determines the speed of the printer or scanner and this speed can be very high. A high resolution of 600 dpi achieved across a 36 inch wide web moving at a speed of 10 feet per minute, requires a cathode ray tube modulation rate of only 26 mega pixels per second, well within the capability of commercially available devices. Anticipated advances in resolutions of 1000 dpi and 2000 dpi are readily obtainable without change in the basic constructional and operational principles of the invention.

Spot and dot size can be controlled by focusing the cathode ray tube in a conventional manner, and intensity (grey scale) of the finally printing dot can be controlled by controlling the intensity of the electron beam in the cathode ray tube.

Further objects and advantages of the invention will be apparent from the following detailed description and drawings. The invention, accordingly, comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description of a presently preferred embodiment, taken in connection with the accompanying drawings, in which:

FIG. 2 is a schematic drawing of the optical system in accordance with the invention configured for operation with a cathode ray tube having a linear sweep;

FIG. 3 is a view similar to FIG. 2 of an alternative embodiment in accordance with the invention showing the configuration of the fiber optics bundle operating in conjunction with a cathode ray tube having a spiral sweep;

DESCRIPTION OF THE PREFERRED EMBODIMENTS

I. OPTICAL PRINTER

An optical system in accordance with the invention is first described in its application to an optical printer.

Figure 1:
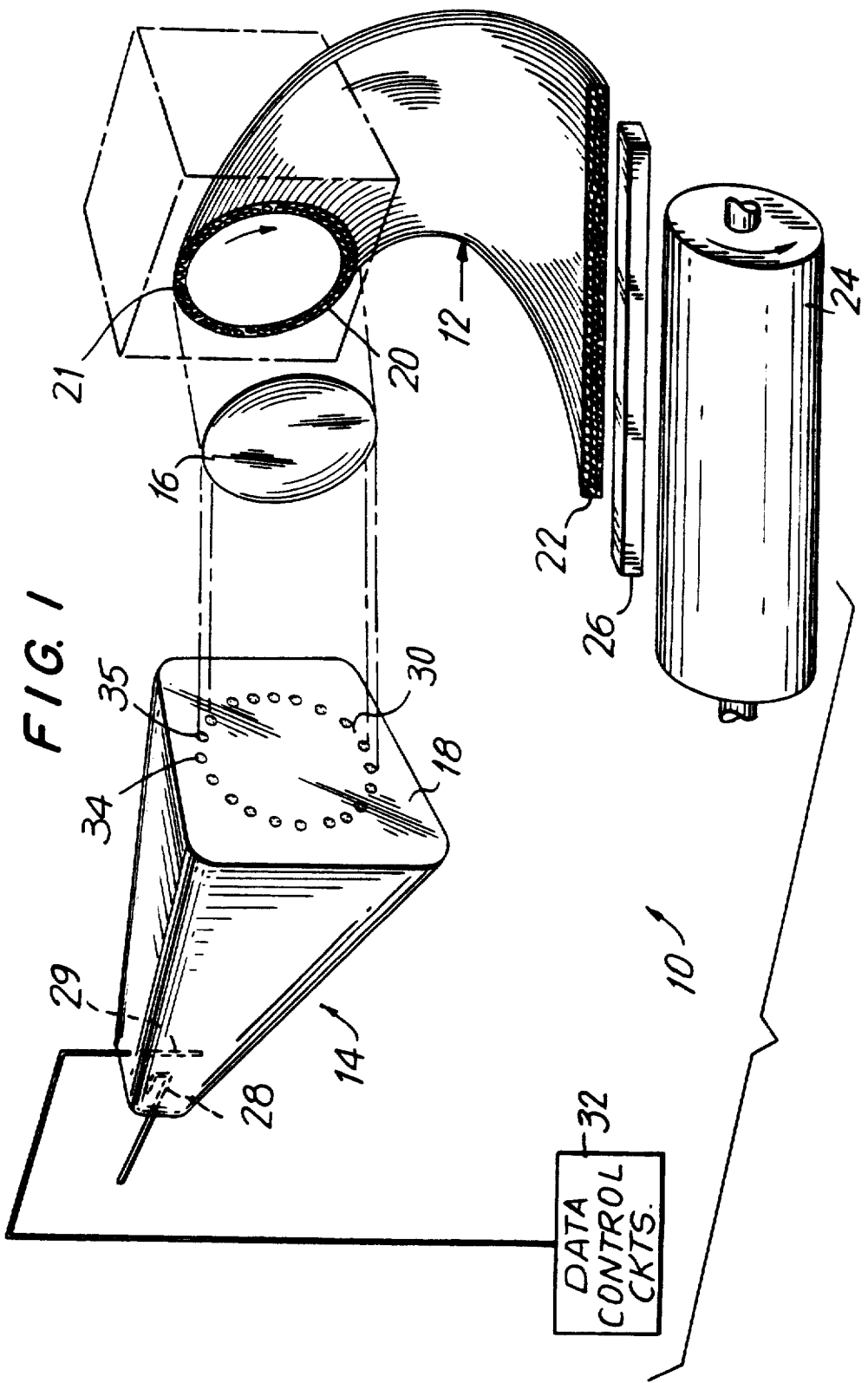
FIG. 1 is a schematic drawing of an optical printer system in accordance with the invention.

With reference to FIG. 1, a high resolution optical printer 10 in accordance with the invention includes an optical fiber transmission array 12, cathode ray tube 14, and a first lens assembly 16 positioned between the screen or face 18 of the cathode ray tube 14 and the input end 20 of the transmission array 12. The input end 20 of the transmission array provides a two-dimensional planar surface and the output end 22 of the transmission array 12 provides a basically one-dimensional, that is, a linear structure. The output end 22 of the transmission array 12 opposes a photosensitive receptor 24 covered, for example, with a photosensitive foil, or another surface well-known in the printing and photocopying arts. The receptor 24 may also be, for example, a photographic film.

A second lens assembly 26 is positioned between the receptor 24 and the output end of the transmission array 12.

As explained more fully hereinafter, the receptor 24 is exposed with a scanned line of dots as a result of light energy being emitted from the output end 22 of the transmission array 12. Each time a scanned line of dots is completed, the receptor drum rotationally advances an amount equal to the thickness of a scan line and another line of dots is exposed. The process continues and the result, as is well-known, is a drum or photosensitive receptor 24 exposed with an entire page of copy, whether it be print or graphics, from which a hard copy may be made by electrophotographic techniques, which are well-known and hence, not further described herein.

The data, that is, the dots of light energy that are spaced sequentially and leave the output end 22 of the transmission array 12, are generated at the input to the transmission array 12 by the cathode ray tube 14, which displays the desired data on its face 18 as a continuous sequence of spots. The cathode ray tube display is conventional in that it has a face that glows where it is impinged by an internally generated beam of electrons. The electron beam flows from the tube cathode 28 of an electron gun and is accelerated toward the tube face 18 in the known manner. By application of orthogonally directed voltage potentials or magnetic fields, the electron beam can be made to move to any portion of the cathode ray tube face 18 with great rapidity. Thus, X and Y positioning of the electron beam, and accordingly, the position of spots of light on the face 18 are controlled by conventional X and Y deflection means in the cathode ray tube.

Further, as is conventional, the intensity of the individual spots produced on the face 18 of the cathode ray tube 14 is independently variable by controlling the electron flow from the cathode 28. This variation or modulation is accomplished by the cathode ray tube control grid 29 which has a modulating voltage applied to it. The electron beam can be entirely cut off, or the intensity of the electron beam can be modulated continuously within a productive range to vary the intensity of light on the cathode ray tube face 18. Further, as is also well-known, the size and focus of the spot can be controlled by other voltages applied to other control grids in the tube.

In the subject invention, the cathode ray tube electron beam deflection means are controlled by an algorithm or by stored data, which sweeps the electron beam in a pre-selected path 30, illustrated in FIG. 1 as a circle. If the cathode 28 were continuously sending its beam to the tube face 18, then a glowing circle of uniform intensity, continuous and complete, would appear on the face. However, for printing with dots, the beam is modulated under control of circuits 32 which provide signals to turn the beam on and off, and if desired, regulate beam intensity. Instead of a continuous glowing circle of constant intensity on the screen 18, there appears a circle of varying intensities in a sequence that represents dot-for-dot the exposures ultimately to be made on the receptor drum 24.

As discussed hereinafter, spot/dot (pixel) data is so rapidly processed (26 mega pixels per second for 600 dpi, 36 inch width, 10 foot per minute output) that a clear-cut demarcation between spots on the cathode ray tube is not always apparent to the eye, but can be electro-optically evaluated. Such a cathode ray tube modulation rate of 26 mega pixels per second is well within the capability of commercially available devices.

Whereas some of the spots occurring on the screen may be used for purposes of system control, every data or information spot that occurs on the screen 18, appears as a dot on the drum 24 in the same sequence as the spots occur. One full sweep on the cathode ray tube, for example, from a sweep start position 21, provides one sweep of dots, that is, one line in the width direction on the receptor drum 24, when using the circular sweep illustrated in FIG. 1.

In other sweep arrangements on the face 18 of the cathode ray tube, a plurality of linear scans (FIG. 2), for example, on the cathode ray tube is used to complete one CRT sweep and one line of dots on the receptor drum 24. Blanking the electron beam as it retraces from the end of one sweep to the starting point of the next sweep is necessary whenever the sweep of the electron beam does not close on itself, as it does in a circular sweep.

The input end 20 of the transmission array 12 is contoured so as to correspond to the shape of the sweep on the face 18 of the cathode ray tube, although the sizes of the two sweep patterns need not be identical. The circumference of the optical fiber array at the input end 20 is dependent upon the length of the output scan line, that is, the exposure width intended as the hard copy output of the printer. Thus, if the printer is required to print on 36 inch wide paper, for example, there must be at least 36 inches in circumference of abutting optical fiber ends arranged in a plane at the input end 20 of the transmission array 12.

When the lens assembly 16, which is positioned between the cathode ray tube 14 and the input end 20 of the optical fiber transmission array 12, provides a 1:1 image size ratio between light entering and light leaving the lens assembly 16, then, for a 36 inch wide printer, the information portion of the sweep on the face 18 of the cathode ray tube 14 must also be 36 inches in length.

In an alternative embodiment, in accordance with the invention, where the lens assembly 16 provides magnification, a shorter sweep may be used on the cathode ray tube, and thus, a smaller cathode ray tube size may be used.

When the lens assembly 16, in a preferred embodiment, provides an image reduction between the cathode ray tube face 18 and the planar arrangement of input end 20 of the transmission array 12, then the intensity of the image projected on the input end 20 of the transmission array 12 is increased by the square of the reduction ratio. Also, and significantly, a higher spatial resolution (smaller dots) may be achieved. Apparent is the interrelationship that exists between the lens system 16 and dot resolution, tube face size and width of the final printed product.

The second lens assembly 26, which is an intermediary between the transmission array 12 and the photosensitive receptor drum 24, prevents light emitted from the output end 22 of the fiber transmission array 12 from scattering (as it tends to do) when it leaves the individual fibers. The linear image at the output end 22 of the array 12 is imaged by the lens assembly 26 onto the receptor 24 with a one-to-one image ratio. This has the advantage from a mechanical standpoint that the output end 22 of the array 12 does not need to be precisely positioned close to the receptor drum 24, and is much less complex than typical lens and mirror arrangements.

The lens assembly 26 includes a plurality of individual lenses, actually large diameter optical fibers, with the desired one-to-one image ratio. The lenses are positioned side-by-side to form a linear array that corresponds in size with the linear pattern at the output end 22 of the transmission array 12. The use of this multiple lens arrangement obviates the need for a large and complex lens system as is generally used in the prior art where a single image of the entire output end 22 of the array 12 would be lens-relayed and brought to the surface of the photosensitive receptor drum 24. Space requirements are reduced as well as cost and complexity in the subject invention by this linear lens arrangement. Such lens assemblies are manufactured by the NSG Corp., Japan, using Selfoc as a trademark.

The optical fiber transmission array 12 provides a coherent arrangement of optical fibers. Thus, for example, with a circular sweep (FIG. 1), a first data point or spot 34 on the screen 18 is focused to impinge on the ends of a cluster of optical fibers that comprise a first light channel (described in more detail hereinafter) in the transmission array 12. The first channel delivers the first dot of what is to become a line of dots onto the receptor drum 24. The second spot 35 of the same sweep on the screen 18 impinges on the second light channel of the transmission array 12 and results in a dot immediately adjacent the first dot on the line of dots being exposed on the receptor drum 24.

For every dot space available in a line of dots on the receptor drum 24, there is, in effect, a separate light channel arranged sequentially around the pattern of input ends 20 of the transmission array 12. It is to be understood that, in accordance with the information to be printed, not every available dot space on the drum 24 is exposed to light. At some dot positions, the light is turned off or reduced in intensity to form the desired image on the drum.

If the resolution is 600 dpi on the 36 inch wide receptor drum 24, there are 600×36=21,600 dot spaces available on the receptor drum 24 for printing 36 inch wide hard copy, and there are 21,600 effectively independently controlled light channels coherently arranged in sequence in a transmission array 12 providing transformation from a circular configuration, at the input end 20, to a linear configuration at the output end 22. For a smaller output width device, the length of the sweep on the cathode ray tube face 18 is reduced. The length of the pattern of light channels required at the input end 20 and the length of the line of light channels at the output end 22 of the transmission array 12 are correspondingly reduced.

Obviously, a printer constructed for 36 inch wide printing can be used for lesser widths without modification to the optics of the device by sweeping only through an arc of the cathode ray tube circle, rather than through the complete circle. Also, by multiplexing of the input data, for example, by dividing a circular sweep into arc segments, it is possible on a printer configured (for example) for a 36 inch width to substantially simultaneously expose three 12 inch (for example) documents on the drum 24. Higher speed printing of narrower documents will also be possible with modifications in cathode ray tube sweep rate and rotational rate of the receptor drum 24.

A single optical fiber is suitable in the transmission array 12 for each dot that is to be exposed on the receptor drum 24. Thus, with a resolution on the receptor drum 24 of 600 dpi, only 600 single fibers would be required for each linear inch of the receptor drum 24 in width. However, such an arrangement requires a precise relative positioning between the sweep on the face 18 of the cathode ray tube 14 and the inlet end 20 of the optical fibers. Any drift in positioning of the sweep on the face of the cathode ray tube might cause spots to be lost to the proper inputs 20, whereby dots may be omitted or misplaced at the outputs of the fibers 22, and on the receptor drum 24. Also, if any single fiber is a poor light transmitter due to a defect in its coating or surface, or is broken, there would be a permanently omitted or low intensity dot, and a resultant streak on the finished output product.

Figure 5A:
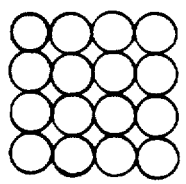
FIGS. 5l–b show arrangements of fibers in accordance with the invention.

Therefore, in accordance with a preferred embodiment of the invention, each light channel for transmission of one dot through the transmission array 12 is comprised of a plurality of fibers closely packed together to form the light channel or cluster. As illustrated in FIG. 5, fibers can be clustered in many ways, for example, in a cubic arrangement (FIG. 5a) which comprises one layer of abutting fibers positioned on top of another layer of abutting fibers, such that a square can connect the centers of four adjacent fibers, two in each layer.

Figure 5B:
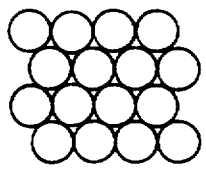

However, in such a cubic arrangement, the interstitial spaces between fibers are relatively large on a percentage area basis, and significant amounts of light, focused on the input ends 20 of the fibers, will enter the interstitial space, rather than into the fibers. Thus, a loss in intensity at the receptor rum 24 occurs. A close packing of fibers, as illustrated in FIG. 5b, can be achieved by staggering the fiber centers. This reduces the interstitial spaces, offers a more efficient light gathering medium, and is preferred.

Thus, what was described above as a fiber transmitting a spot/dot of light, is in an embodiment according to the invention, composed of many smaller fibers in a stacked arrangement.

Nevertheless, provision of fiber clusters to transmit a single spot/dot of light does not assure that the final product will not be streaked or have missing information due to the possible presence of fibers that are broken or are not good light transmitters. This hazard for defective performance is virtually eliminated when the smallest spot that is focused on the inlet end 20 of the transmission array 12 has a diameter that is greater than the diameter of the individual fibers that are used in the fiber array. Then, more than one fiber will always transmit the spot/dot energy and an effective amount of light will be delivered from the array, even if an occasional fiber is defective.

The diameter of a light spot, including a spot on the face of a cathode ray tube, is measured against generally accepted energy standards. Intensity of light is not uniform in the spot, being most intense at the center and diminishing in a Gaussian distribution in every direction from the center. However, established standards define spot diameter based upon the energy of light contained in a circle about the spot center. The circle, which best defines the spot diameter from a utilitarian viewpoint in optical scanning and printing, depends upon the sensitivity of the detector that responds to the light transmitted through the fiber array, or to the sensitivity of a photosensitive surface, for example, at the receptor drum 24. A spot diameter that includes the peak intensity at the spot center, as well as 50% of the power in the spot, is often used as a standard. Also, a spot diameter that encompasses 63% (1/e) of the power in the spot is also frequently used, as is a $1/e^2$ definition of a spot diameter wherein 86% of the light power is included in the spot.

Thus, if, for example, 63% of the power in a spot is required for effective operation with the photosensitive medium, then a fiber selected for use in the array has a diameter smaller than the spot diameter which corresponds to 63% of the light power in the spot. In other words, the fiber diameter must be less than 1/e, that is, a single fiber does not physically have a cross-sectional area capable of receiving 63% of the spot energy but, for example, only 60% of the spot energy. Then, the spot always overflows even a single fiber which may be concentric with the spot, and also enters an adjacent fiber or fibers.

Individual fibers are now available with diameters between 5 and 10 microns. Smaller fibers are in development. As one linear inch equals 25,400 microns, there are approximately 42 microns in linear width available for each dot, if the resolution is to be 600 dpi. Thus, for example, a 7×7 cluster or channel of fibers having 6 micron diameter will accommodate a 600 dpi printing requirement.

Depending upon the ability of the optical lenses and the cathode ray tube to focus spots, space is available for a resolution of 1,000 dpi when using 10 micron fibers as the most basic unit, and 2,000 dpi capability can be provided using fibers of lesser diameter as the basic unit for forming light channels. A transmission array constructed of fiber clusters or channels, as described, can be used for higher and lower resolution printing. For a higher resolution, a lesser number of the smaller fibers are dedicated to what is in effect, a smaller light channel. Physically, the two-dimensional pattern and the linear pattern of the transmission array are continuous segments of fiber layers without any actual physical demarcation to identify clusters or light channels.

The transmission array of FIG. 1 is configured for a circular sweep on the cathode ray tube. This has the advantage that there is no retrace time required for the electron beam. The highest rates of printing are achievable with sweeps that close upon themselves.

FIG. 2 illustrates a preferred cathode ray tube sweep pattern or raster made up of linear sweep segments 1,2 . . . , M. A sequential sweep of all of the segments is necessary to complete one line of dots on the receptor drum 24. Each linear sweep segment, that is, each horizontal sweep of the cathode ray tube, is received on a linear segment of the transmission array input end. As before, the fiber segment includes a number of light channels made up of layered clusters of optical fibers. When the light from each segment is received in the proper sequence at the receptor drum 24, the channels being coherent, a complete line of dots is exposed.

These linear segments can be modularized, with fixed thickness and fixed scan width, so that any width of hard copy printed line can be accommodated in an apparatus constructed from such coherent optical fiber modules merely by arranging the input ends of the modules in the desired pattern corresponding to the cathode ray tube pattern, and by arranging the output ends as a continuous extended line.

FIG. 3 illustrates a sweep pattern for the electron beam of the cathode ray tube that has a spiral contour. A retrace is required from the end of one sweep to the beginning of the next sweep, and this reduces the potential speed of the printer. Nevertheless, the spiral sweep may accommodate a wider printed line than a circular sweep on a cathode ray tube of the same size. As illustrated, with the spiral sweep, it is necessary that the input ends of the fiber channels in the transmission array be arranged in a corresponding spiral pattern. A coherent linearization of the two-dimensional spiral sweep on the cathode ray tube face 18 between the ends A,B of the sweep and the corresponding ends A,B at the output end 22 of the array 12, is illustrated.

Figure 4A:
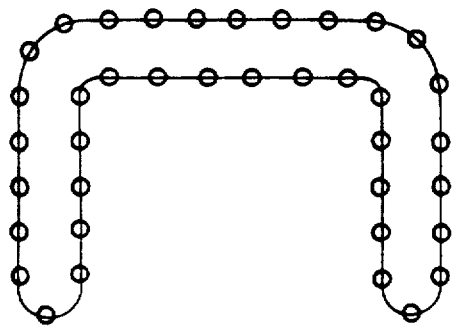
FIGS. 4a–c illustrate sweep patterns for the cathode ray tube suitable for application in alternative embodiments of the subject invention.
Figure 4B:
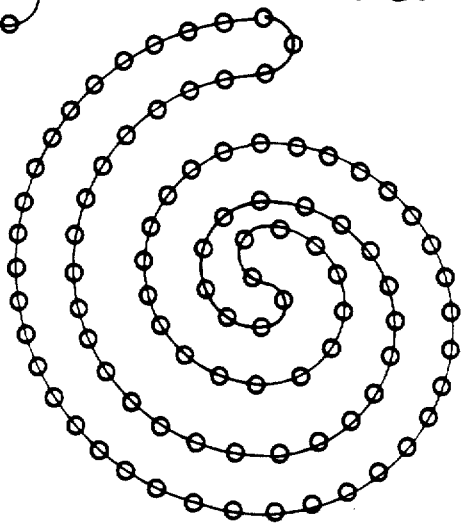

A spiral sweep may be doubled as illustrated in FIG. 4(b) so that a greater length is achieved in the pattern before it closes on itself or is retraced to start a new sweep. These sweeps are never permitted to cross except possibly at positions where data spots never appear, and the electron beam is blanked during any retrace so that unwanted light does not impinge on the photosensitive receptor drum 24 and reduce product quality. Sharp turns and reversals of the sweep contour are less desirable because of the difficulty in matching the input of the transmission array to such shapes.

Fibers are held in their desired positions, in layers, and in the input patterns and output line by means of an adhesive, for example, an epoxy. The two dimensional input pattern of the transmission array may be fixed in a rigid matrix plate 37,39, as illustrated in FIGS. 2, 3. In such matrix plates, the input ends of the fibers are fixed in patterns with spacings that correspond with the patterns and spacings on the face of the cathode ray tube. Spacings in the cathode ray tube pattern are easily adjusted. Applicants U.S. Pat. No(s). 3,544,192 and 3,718,515 disclose fiber optic transmission arrays and methods for production of circular to linear optical fiber arrays.

A printer, outputting a 36 inch wide product, for example, will likely have a linear output 22 from the transmission array 12 that slightly exceeds 36 inches. Therefore, the need for precision in aligning the output end 22 of the fibers with the width dimension of the receptor drum 24 is reduced. Also, the first data dot need not be produced by the very first light channel in the array. Light channels that are dedicated for image production can be preceded and followed in the linear array by additional control channels, which on the input end, correspond with the sweep pattern on the cathode ray tube face 18. Thus, a control dot that appears on the face of the cathode ray tube and passes through a control light channel can synchronize commencement of input of actual spot/dot data from the control circuits 32. The image data can then follow the control spot with a given clock timing or a predetermined number of control dots may appear before the first data dot is applied to the cathode ray tube grid 29. Thus, the cathode ray tube sweep rate which can be accurately controlled, in turn synchronizes the flow of information without need for circuits which otherwise would be necessary to synchronize the flow of data from the circuits 32 with the sweep synchronization circuits (not shown) of the cathode ray tube. End-of-sweep control spots can be used to synchronize retrace of the CRT regardless of changes in sweep rate.

Although this invention is not limited to the use of a cathode ray tube in order to form a two-dimensional light source pattern, a cathode ray tube has the attendant advantage of the use in combination of the dynamic focus and beam intensity controls found in conventional cathode ray tube applications to obtain different cathode ray tube spot sizes, while holding constant the desired light intensity per unit area on the receptor drum 24. This provides an ability to dynamically change resolution, as well as to generate "true half-tone" dots, rather than building up half-tones from an accumulation of smaller dots. Such a build-up results in non-smooth edges. The ability to dynamically control the light intensity while using constant dot size also allows for generation of continuous tone (grey) images. All of these capabilities, namely high resolution, half-tone and grey scale, can be accomplished on the same hard copy output product. In conventional printing, gray scale is effected by changing dot size with a resultant loss in resolution.

Stated otherwise, the spot size on the cathode ray tube face can be changed by conventional focus circuits used in cathode ray tube applications. Thus, the number of fibers in each light channel that receive light energy from the cathode ray tube can be varied. At the same time, the intensity of the spots on the cathode ray tube may be varied such that, for example, when a spot size is reduced the intensity of the spot may also be reduced so that the intensity at the receptor drum 24 remains the same. Intensity of the spot may be increased as spot size increases when a constant intensity level is desired at the receptor drum 24. Also, as indicated, all levels of exposure on the photosensitive receptor 24 are possible through inter-related control of spot size and intensity. The use of optical light channels having a cluster of fibers for each spot/dot, rather than a single fiber, not only provides a more reliable light transmission system from a physical viewpoint, but also accommodates the changing spot size and intensity requirements. The physical advantages of a layered fiber array are a thicker, e.g., 4 mils, ribbon at the linear end of the fibers, which ribbon is easier to handle in production, and a sturdier, stronger finished product. Segments of ribbon can be precisely butted together to achieve a desired width at the linear end and desired shape at the two-dimensional end of the array.

II OPTICAL SCANNER

An optical system in accordance with the invention is now described in its application to an optical scanner.

Figure 6:
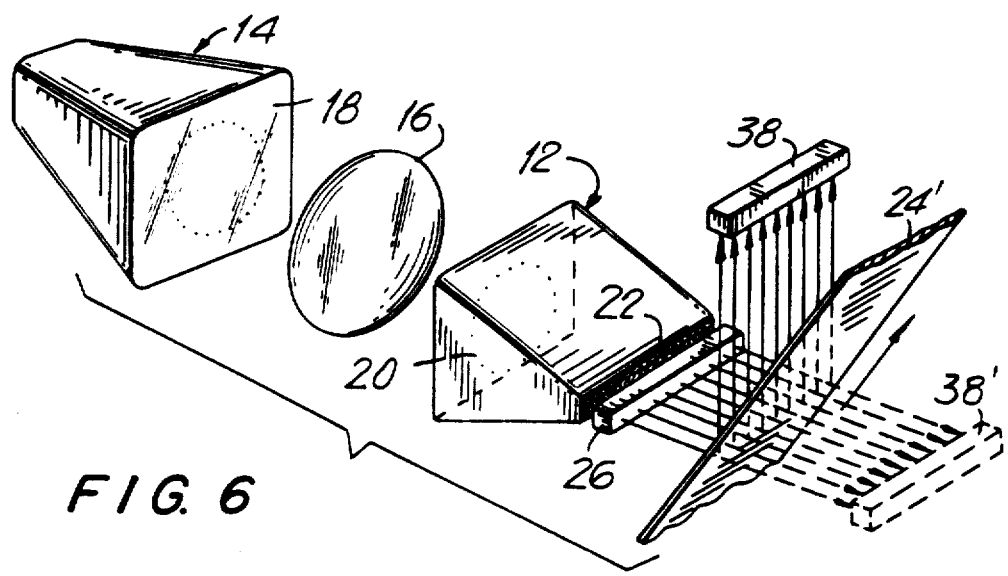
FIG. 6 is a schematic drawing of an optical scanner system in accordance with the invention.

With reference to FIG. 6, the scanner includes the same optical system as provided in the printer of FIG. 1. Corresponding parts are given the same reference numerals. The scanner includes a cathode ray tube 14, having its face or screen 18 opposed to a lens assembly 16. The optical fiber array 12 has an arrangement of fibers at its inlet 20 that corresponds to a two-dimensional sweep pattern produced on the face 18 of the cathode ray tube 14.

Figure 4C:
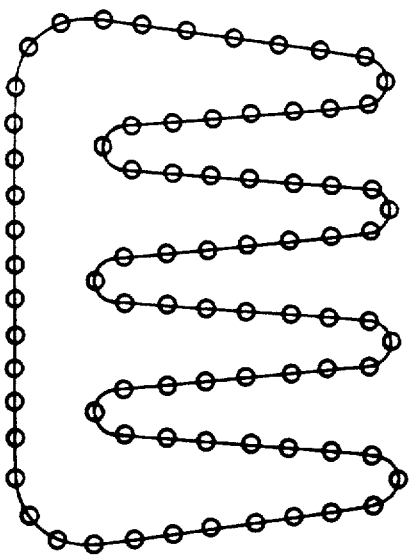

For purpose of discussion, a circular sweep is described, although any other sweep patterns as discussed above in relation to the optical printer, illustrated in FIG. 4b, and other patterns, illustrated in FIGS. 4a, 4c, may be used so long as the inlet 20 of the optical fiber array is similar to the pattern on the cathode ray tube.

The lens assembly 16, as before, images the pattern on the face 18 of the cathode ray tube onto the planar input end 20 of the optical transmission array 12, preferably with a reduction in size, as described above, to improve resolution. Light from the face 18 of the cathode ray tube 14 passes through the lens assembly 16, through the transmission array 12, and through the second lens assembly 26 to impinge on the medium that is to be scanned for its content. As illustrated, the medium 24' is a planar sheet, for example, a sheet of paper on which there may be printing and graphics. The printed medium 24' that is to be scanned, may also be on a drum.

Light, indicated by arrows, from the lens assembly 26, that impinges on the surface of the media 24', is reflected and detected by a detector strip 38, having a length that corresponds to the width at the linear output end 22 of the transmission array 12. Such a detector strip 38, for example, a segmented amorphous silicon detector strip, is generally available. The detector strip converts instantaneous light input to a corresponding instantaneous electrical potential.

The linear width at the output 22 of the transmission array 12 corresponds to the maximum width of the medium 24', which is to be scanned by the apparatus. Narrower media can also be scanned.

Operation is now described, again assuming a circular pattern on the face 18 of the cathode ray tube 14, and a circular arrangement of fibers at the inlet 20 of the transmission array 12.

Dots of constant intensity, and spaced apart around a circle are formed in sequence on the cathode ray tube screen 18 at a repetition rate which assures a desired resolution in scanning. Thus, if the medium 24' is to be scanned on the basis of 600 dots per linear inch of document width, and the document is 36 inches wide, then 600×36=21,600 dots are produced sequentially in a single circular sweep on the cathode ray tube. To the human eye, a glowing circle would be apparent on the screen, but the detector strip readily distinguishes a dot from a non-dot level of light energy.

By way of the transmission array 12, the sequential 21,600 dots of light are impinged on the medium 24' and reflected individually to the detector strip 38 positioned adjacent thereto. The quantity of light that reflects from each light dot impinged on the medium 24', depends upon the information provided on the surface of the medium 24' that is being scanned. For each dot, the detector strip 38 provides a substantially instantaneous electrical output corresponding in magnitude to the level of reflected light from the medium 24'.

This dot-by-dot information gathered by the detector strip 38 may be stored in a memory by conventional means, and later used to operate a printer of any type, including an optical printer, as illustrated in FIG. 1 and described above. The signals from the detector strip, whether stored in memory or applied directly, can be used in the data control circuits 32 (FIG. 1) to indicate the desired presence of a dot when printing, and the signals can also be applied to the control grid 28 of the cathode ray tube to determine the intensities of the respective dots to be printed.

In an application wherein the scanned medium 24' transmits light, the level of transmitted light from each light dot impinged on the medium depends upon the information provided on the medium 24'. As indicated with broken lines on FIG. 6, the transmitted light is received by a repositioned detector strip (broken lines), identified with the reference numeral 38'. Otherwise, operation and construction is as described above for a reflective medium 24'.

In alternative embodiments of an optical scanner in accordance with the invention, either or both of the lens assemblies 16,26 may be omitted from the construction. When the lens assembly 16 is removed from between the cathode ray tube and the inlet 20 of the transmission array 12, the array 12 is brought close to, and precisely aligned with the face 18 of the cathode ray tube. When the lens array 26 is omitted, the output end 22 of the transmission array 12 is brought closer to the surface of the medium 24' to be scanned. The optical fiber array 12 in the optical scanner (FIG. 6), may include light channels that are used for control purposes, for example, representing the beginning and end of the cathode ray tube sweep. Signals delivered through these light channels and received at the detector strip 38, can be used to synchronize storage of the data at proper addresses in memory.

Figure 7:
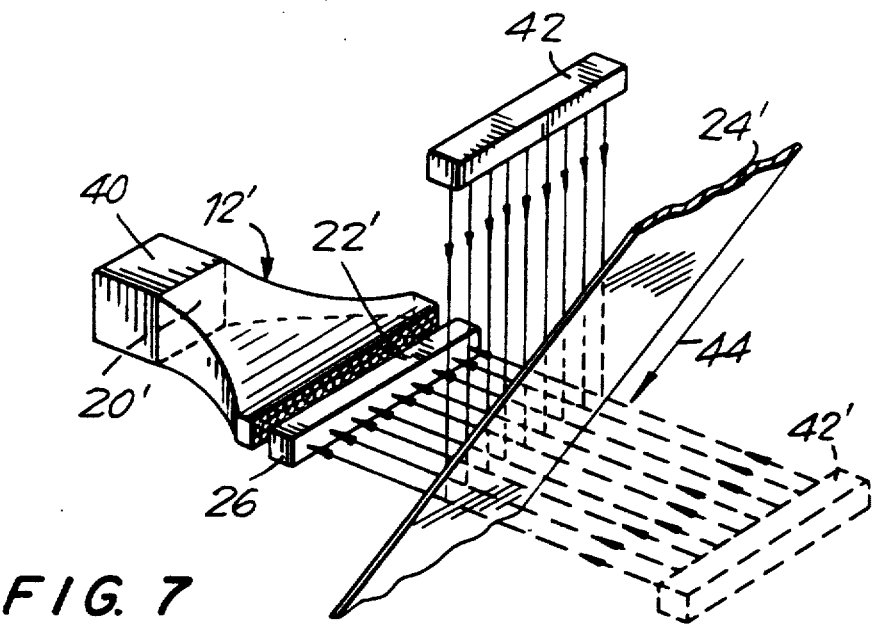
FIG. 7 is a schematic drawing of an alternative embodiment of an optical scanner in accordance with the invention.

FIG. 7 illustrates an alternative embodiment of an optical scanner in accordance with the invention. In this arrangement, the transmission array 12, is linear at one end, 22', and converts to a two-dimensional shape at the other end, 20'. This shape can be any two-dimensional shape, for example, a rectangle, as illustrated. When the array 12, abuts an addressable photo detector array 40, such as a CCD, or the light from the array 12' is imaged thereon, output signals are provided in proportion to the impinging light.

The medium 24' to be scanned is exposed to a light source 42 that illuminates the entire surface to be scanned, or may only illuminate that portion, or line, that instantaneously is reflecting light to the linear end 22' of the transmission array 12' by way of the intermediate lens 26 (as used in FIG. 1). The photo detector array 40 is scanned two dimensionally for the instantaneous signals thereon, and data may be recorded in sequence corresponding coherently to light received from one end to the other end of the linear configuration 22' of the fiber transmission array 12'. (A random arrangement, or any ordering of fibers, at the output ends 20' of the array 12', with electronic "unscrambling" of data to achieve a proper data output sequence, may also be used as described, for example, in U.S. Pat. No. 4,674,834.)

Thus, if a 36 inch width medium 24' is to be linearly scanned with a resolution of 600 dpi, 600×36 = 21,600 readings will be taken from the photo detector 40 in sequence for each scan, with each reading representing a sequential light channel through the transmission array 12' corresponding in toto to the full width of the medium 24'. After this reading of data, the medium advances in the direction of the arrow 44; the photo detector array 40 is cleared of prior data, and a new sweep of readings is recorded. As before, this stored data can be used to operate any printer mechanism, but in particular, may be used with an optical printer as illustrated in FIG. 1. The data provided by the photo detector array 40, indicates both the presence or absence of dots on the medium 24', as well as the intensity thereof based upon the reflections of light from the medium 24' into the fibers at the linear end 22'.

The detector array 40 is provided with a pattern and quantity of individually addressable pixels, that is, addressable positions, on its face to accommodate the desired scanning resolution. Each pixel receives the light transmitted through a plurality of fibers that are stacked and clustered, as described above, so as to reduce the requirements for precision alignment between individual fibers and the detector array 40, and to compensate for defective individual fibers.

In an application wherein the scanned medium 24' transmits light, the light source is positioned to direct light through the medium 24' toward the lens 26 and fiber array 12'. The repositioned light source is indicated in broken lines and with the reference numeral 42'. Otherwise, operation and construction is as described above for the reflective medium 24'.

In an alternative embodiment of an optical scanner in accordance with the invention, wherein the scanned medium transmits light, the intermediate lens 26 may be omitted.

It will thus be seen that the objects set forth above, and those made apparent from the preceding description, are efficiently attained and, since certain changes may be made in the above constructions without departing from the spirit or the scope of the invention, it is intended that all matter contained in the above description, or shown in the accompanying drawings shall be interpreted as illustrative and not in a limiting sense.

What is claimed is:

1. An optical system wherein lines of sequential dots are formed on a receptor, comprising:
    addressable light spot generator means for producing a two-dimensional pattern of light emitting spots;
    a transmission array of optical fibers having input and output ends arranged with physical coherence, said array having a two-dimensional arrangement at said input ends in a first pattern geometrically corresponding to the two-dimensional spot generator pattern, said array having said output ends of said fibers arranged in a linear pattern with a width corresponding to the width of said receptor and a thickness exceeding the diameter of the respective individual fibers, said fibers being arranged in two dimensions as clusters of fiber ends, said input ends being positioned relative to said spot generator pattern so as to receive light therefrom, the diameters of the spots received at said input ends of said fibers from said two-dimensional spot generator pattern exceeding the diameter of the respective individual optical fibers, said output ends facing said receptor and directing light thereto, said light from said generator means being transmitted through and emerging from said array, said linearly arranged output ends corresponding sequentially and coherently with sequential spots of light from said generator pattern.

2. An optical system as in claim 1, further comprising means for fixedly maintaining said fiber arrangements.

3. An optical system as in claim 1, wherein said spots are generated at intervals along said generator pattern, and said fiber ends are correspondingly positioned to provide a respective light channel of said arranged fiber input ends for each said spot.

4. An optical system as in claim 3, wherein light emitted from a generated spot impinges on more than one fiber at the input end of the corresponding light channel of said transmission array.

5. An optical system as in claim 1, and further comprising means in said addressable light spot generator means for controlling at least one of the intensity and the size of said spots produced by said generator.

6. An optical system as in claim 4, and further comprising means in said addressable light spot generator means for controlling at least one of the intensity and the size of said spots produced by said generator.

7. An optical system as in claim 4, and further comprising first lens means for focusing an image of said generated spot pattern on said fiber input ends, the size and geometry of said focused image substantially matching the size and geometry of said first pattern at the input end of said array, said first lens means being positioned between said spot generator pattern and said input end pattern of said array.

8. An optical system as in claim 4, and further comprising a second lens means for gathering light emitted from said output ends of said fibers and for focusing an image of said light in an image plane on said receptor, said second lens means being positioned adjacent said output ends of said transmission array.

9. An optical system as in claim 8 wherein said second lens means is a linear lens array corresponding with said fiber output ends of said transmission array, said second leans means providing a one-to-one image ratio between said respective light channels and said receptor.

10. An optical system as in claim 1, wherein said spot generator is a cathode ray tube and said spot pattern is generated on the face of said cathode ray tube.

11. An optical system as in claim 10, wherein said spot pattern is generated by sequential sweeps on said cathode ray tube face, a series of sequential spots being generated along said pattern, said spots being subject to modulation at least in size and intensity by said cathode ray tube, the light from the outlet end of said transmission array being suitable for imaging on said receptor.

12. An optical system as in claim 4, wherein said spot generator is a cathode ray tube, said spot pattern being generated by sequential sweeps on said cathode ray tube face, a series of sequential spots being generated along said pattern, each said spot having the same intensity of light, the light from the outlet end of said transmission array being suitable for illuminating an image for scanning.

13. An optical system as in claim 9, wherein said spot generator is a cathode ray tube and said spot pattern is generated on the face of said cathode ray tube.

14. An optical system as in claim 1, wherein substantially all of said generated spots have the same intensity and said receptor is the object to be scanned, and further comprising detector means for sensing the light reflected from said receptor, said detector producing a signal corresponding in level to the instantaneous reflection of light from said receptor.

15. An optical system as in claim 6, wherein said generated spots have the same intensity and said receptor is the object to be scanned, and further comprising detector means for sensing the light reflected from said receptor, said detector producing a signal corresponding in level to the instantaneous reflection of light from said receptor.

16. An optical system as in claim 8, wherein said generated spots have the same intensity and said receptor is the object to be scanned, and further comprising detector means for sensing the light reflected from said receptor, said detector producing a signal corresponding in level to the instantaneous reflection of light from said receptor.

17. An optical system as in claim 14, wherein said spot generator is a cathode ray tube and said spot pattern is generated on the face of said cathode ray tube.

18. An optical system as in claim 16, wherein said spot generator is a cathode ray tube and said spot pattern is generated on the face of said cathode ray tube.

19. An optical printer system for producing hard copy, wherein photo images are formed from lines of sequential dots on a photosensitive receptor, comprising:
- a cathode ray tube including means for providing a focused electron beam impacting on the face of said tube, said face glowing with light where impacted,
- circuit means for determining a two-dimensional sweep of said electron beam on said tube face, and for modulating said electron beam to produce glowing spots on said face in response to signals corresponding to information to be imaged on a line of said dots on said photosensitive receptor; and
- a transmission array of coherent optical fibers having input and output ends arranged with physical coherence, said array having a two-dimensional arrangement of said input ends in a first pattern geometrically equivalent to the two-dimensional sweep of said cathode ray tube, said array having said output ends of said fibers arranged in a linear pattern with a width corresponding to the width of said image and a thickness exceeding the diameter of the respective individual fibers, said fibers being arranged in two dimensions as clusters of fiber ends, the diameters of the spots received at said input ends of said fibers from said cathode ray tube exceeding the diameter of the individual optical fibers in said array, said input ends facing said tube face for receiving images of light spots therefrom, said output ends facing said receptor and directing light dot images thereto, said light being transmitted through said array with light spots from said cathode ray tube sweep corresponding sequentially with dots formed sequentially along a line on said receptor.

20. An optical printer system as in claim 19, further comprising means for fixedly maintaining the positions of said fibers.

21. An optical printer system as in claim 19, wherein said spots are produced at intervals along said cathode ray tube pattern, and said fiber ends are correspondingly positioned to provide a respective light channel of arranged fiber input ends for each said spot.

22. An optical printer system as in claim 21, wherein light emitted from a spot impinges on more than one fiber in the corresponding light channel of said transmission array.

23. An optical printer system as in claim 19, wherein said circuit means modulates at least one of the intensities and the sizes of said spots produced by said generator.

24. An optical printer system as in claim 22, wherein said circuit means modulates at least one of the intensity and the size of said generated spots.

25. An optical printer system as in claim 19, and further comprising first lens means for focusing an image of said generated spot pattern on said fiber input ends, the size of said focused image matching the size of said first pattern at the input end of said array, said first lens means being positioned between said spot generator pattern and said input end pattern of said array.

26. An optical printer system as in claim 19, and further comprising a second lens means for gathering light emitted from said output ends of said fibers and for focusing an image of said light on said receptor, said second lens means being positioned between said receptor and said output ends of said transmission array.

27. An optical printer system as in claim 26, wherein said second lens means is a linear array corresponding with said fiber output ends of said transmission array, said second lens means providing a one-to-one image ration between said respective light channels and said receptor.

28. An optical scanning system wherein said image is scanned in consecutive lines of sequential dots, comprising:
- addressable photo detector means having a two-dimensional face for receiving a pattern of light; and
- a transmission array of optical fibers, said array having an input end and an output end, said array having a two-dimensional arrangement at said output end in a first pattern geometrically corresponding to the two-dimensional photo detector face, said input end of said array having said fibers arranged in a linear pattern, said output end being positioned relative to said photo detector face so as to deliver light thereto, said input end being positioned to receive light from the image to be scanned, said fibers being arranged in two dimensions as clusters of fiber ends, said received light being transmitted through and emerging from said array, the light received by said fibers at said linearly arranged input end being coherently transmitted to consecutive positions on said photo detector face by said array.

29. An optical scanning system as in claim 28, further comprising means for fixedly maintaining said fiber arrangements.

30. An optical scanning system as in claim 28, more than one fiber at the output end of said transmission array is positioned to deliver light to each said consecutive position, respectively, of said photo detector.

31. An optical scanning system as in claim 28, and further comprising lens means for focusing said scanned image on said fiber input ends, the size of said focused image matching the size of said linear pattern at the input end of said array, said lens means being positioned between said scanned image and said linear input end pattern of said array.

32. An optical scanning system as in claim 31, wherein said lens means gathers an instantaneous line of light from said scanned image and focuses said image line on said linear fiber array input end.

33. An optical scanning system as in claim 32, wherein said lens means is a linear lens array, corresponding in length with said fiber input end of said transmission array, said lens means providing a one-to-one image ratio between said fiber input end and said scanned image.

* * * * *